United States Patent [19]
Whiteside

[11] Patent Number: 5,497,802
[45] Date of Patent: Mar. 12, 1996

[54] VANDALPROOF CAP FOR FLUSH VALVE CHECK VALVE

[75] Inventor: John F. Whiteside, Franklin Park, Ill.

[73] Assignee: Sloan Valve Company, Franklin Park, Ill.

[21] Appl. No.: 373,796

[22] Filed: Jan. 17, 1995

[51] Int. Cl.⁶ .................................................. F16K 27/08
[52] U.S. Cl. ...................... 137/377; 137/327; 137/382.5
[58] Field of Search ................................ 137/382, 382.5, 137/377, 327

[56] References Cited

U.S. PATENT DOCUMENTS

| | | | |
|---|---|---|---|
| 1,589,894 | 6/1926 | Mueller et al. | 137/382 |
| 3,709,249 | 1/1973 | Diaz | 137/382.5 |
| 4,182,361 | 1/1980 | Oakey | 137/382.5 |
| 4,332,331 | 6/1982 | Fawley | 137/382 |
| 4,566,481 | 1/1986 | Leopold, Jr. et al. | 137/382.5 |
| 4,880,134 | 11/1989 | Wood, Jr. | 137/382 |
| 4,936,336 | 6/1990 | McCauley et al. | 137/382.5 |
| 5,072,750 | 12/1991 | Poms et al. | 137/377 |

*Primary Examiner*—A. Michael Chambers
*Attorney, Agent, or Firm*—Dorn, McEachran, Jambor & Keating

[57] ABSTRACT

A control stop for use in a plumbing supply line includes a body having an inlet and an outlet. There is a valve seat in the body and a valve member movable toward and away from the valve seat to control flow from the inlet to the outlet. There is an opening in the body providing exterior access to the valve member for adjustment thereof. A vandalproof cap assembly closes the opening. The cap assembly includes a sleeve threadedly attached to the body about the access opening. A cap is mounted on the sleeve for free rotation relative thereto. The sleeve and cap have tool receiving openings therein which, when in alignment, and with a tool inserted therein, will provide for concurrent movement of the sleeve and cap for removal thereof from the body access opening.

4 Claims, 1 Drawing Sheet

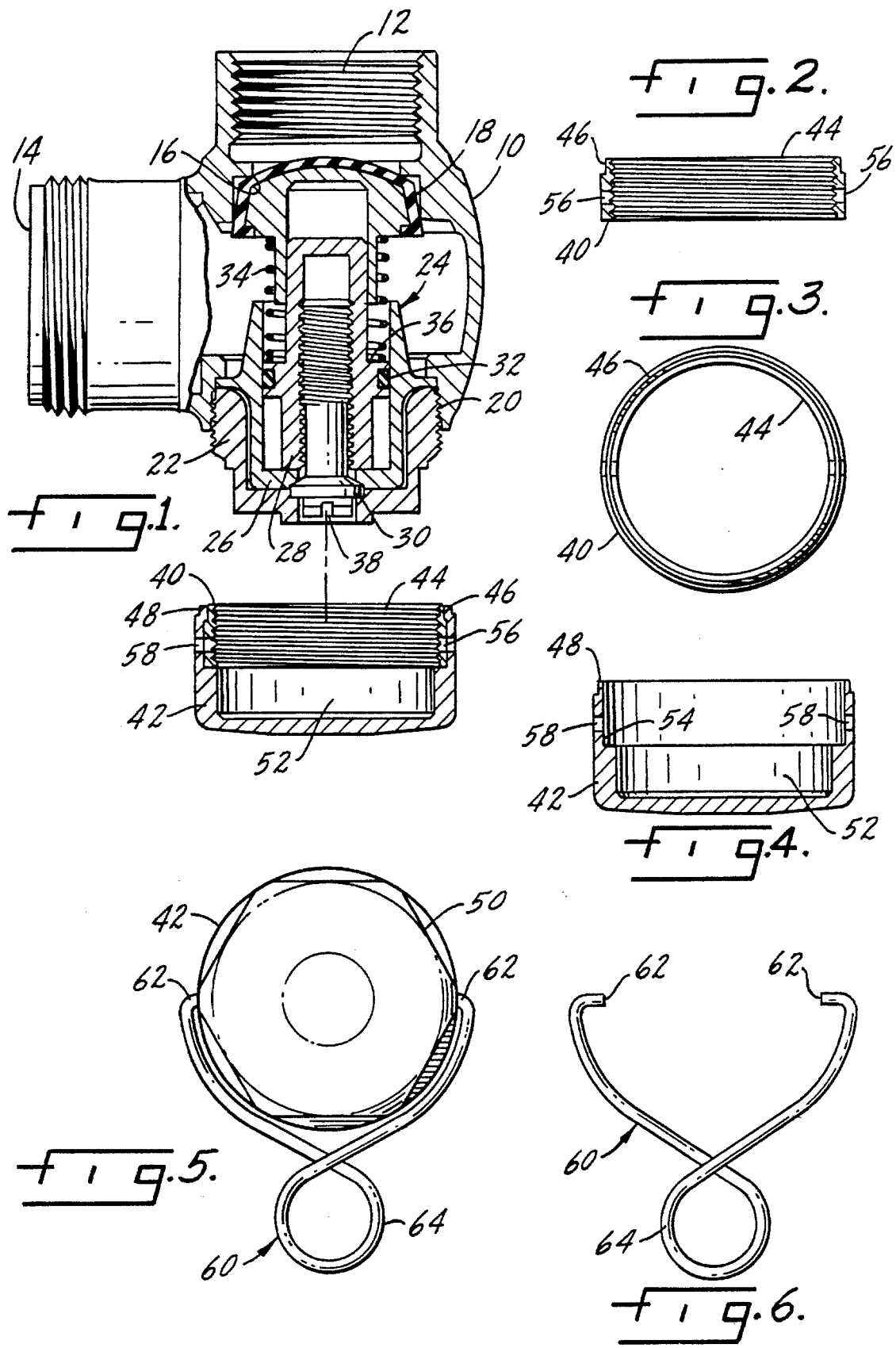

VANDALPROOF CAP FOR FLUSH VALVE CHECK VALVE

THE FIELD OF THE INVENTION

Public washrooms conventionally utilize flushometers to supply a measured amount of water to either a urinal or water closet. Associated with such flushometers is a plumbing fitting designated as a control stop. This plumbing fitting connects the flushometer with the water supply and has a valve member biased toward a closing position. The bias upon the valve member is adjustable so as to control the water supply to the flushometer. Normally, the adjustment on the control stop is not utilized once the plumbing fitting has been installed, except for those instances in which it is necessary to totally shut off the water supply to a flushometer. At such time maintenance personnel will remove the stop cap and close the valve member so that water is no longer supplied to the flushometer.

Unfortunately, such stop caps have been the object of vandalism. The stop caps are decorative and are often removed from the control stop, exposing the adjustment to the valve member which then may also be subject to vandalism. A further problem associated with such control stops is one brought about by the difference in temperature between the room in which the control stop is located and the cold water which periodically flows through the control stop. The thermal cycle brought about by the repetitive change in temperature of the metallic control stop often reduces the torque required to remove the stop cap to essentially zero, making it easy to remove and only loosely held in position.

The present invention provides a vandalproof cap assembly for a control stop, with the cap being freely rotatable when properly installed and only removable by a person utilizing the appropriate tool and with knowledge of how to remove the cap. Specifically, the cap assembly includes a sleeve which will be threadedly engaged to the valve access opening on the control stop body. There is a cap with an interior recess and once the recess is positioned over the sleeve, the end of the cap is crimped inwardly so that the cap is attached to the sleeve. Both the cap and the sleeve have diametrically opposed tool receiving openings. When the appropriate tool is positioned in the openings and they are aligned, the cap and sleeve may be concurrently rotated so that the assembly is removable from the access opening. The cap and sleeve assembly may only be removed from the sleeve by use of the appropriate tool and knowledge of how the tool functions and removal. Usually only maintenance personnel will be aware of the removal technique and will be equipped with the appropriate tool.

SUMMARY OF THE INVENTION

The present invention relates to vandalproof caps for plumbing fittings and in particular to a vandalproof cap for a control stop used in combination with a flushometer to provide water to a urinal or water closet.

A primary purpose of the invention is a cap assembly for a control stop which may not be removed without the appropriate tool and knowledge as to the use thereof.

Another purpose is a vandalproof control stop cap assembly made up of a sleeve and a cap rotatable relative to the sleeve with each element having alignable tool access openings.

Another purpose is a vandalproof stop cap assembly as described in which the cap is freely rotatable relative to the sleeve, and may only be removed, with the sleeve, from the control stop access opening.

Other purposes will appear in the ensuing specification, drawings and claims.

BRIEF DESCRIPTION OF THE DRAWINGS

The invention is illustrated diagrammatically in the following drawings wherein:

FIG. 1 is an exploded side view, in part section, through a control stop as described herein;

FIG. 2 is a section of the cap assembly sleeve;

FIG. 3 is a top view of the sleeve;

FIG. 4 is a section of the cap;

FIG. 5 is a plan view of the removal tool applied to the cap assembly; and

FIG. 6 is a plan view of the removal tool.

DESCRIPTION OF THE PREFERRED EMBODIMENT

Control stops are conventionally used with flushometers in public washrooms and as the name implies, both control the flow of water to the flushometer and function as a stop when it is necessary to completely close the water supply to the flushometer for maintenance or removal. Control stops are well known in this art. Because it may be necessary to move the stop to a fully closed position, it is necessary that there be access to the stop for maintenance personnel. In the prior art, the access opening was covered by a cap which was threaded onto the body of the control stop. There are problems with such a construction. First, the constant cycling between hot and cold caused by the warm temperature of the room and the cold temperature of the water results in a cap which is very loosely attached to the body. Little torque is required to remove it. The second problem is vandalism and the caps are both decorative and useful to vandals for other purposes. Once the cap has been removed, the exposed stop is an invitation to a vandal to either close the stop, preventing the flow of water to the flushometer, or to back off the stop in such a way that water constantly flows to the flushometer. The present invention provides a vandalproof cap which eliminates the above-described problems.

In the drawings, the body of the control stop is indicated at 10 and has a threaded inlet 12 and a threaded outlet 14. The outlet will be connected to a flushometer and the inlet will be connected to the water supply. There is a valve seat 16 formed adjacent the inlet 12, and a valve member or plug 18 is movable to close upon the valve seat, thus shutting off the flow of water between the inlet and the outlet.

The opening for the stop is indicated at 20 and a bonnet 22 is threadedly mounted in this opening. The bonnet 22 mounts a collar and sleeve subassembly 24 which includes a collar 26 holding a movable adjusting sleeve 28 which threadedly mounts a stem 30. An O-ring 32 forms a seal between the adjusting sleeve 28 and the interior of collar 26. A coil spring 34 is seated upon a shoulder 36 of the adjusting sleeve and biases the plug 18 toward the closed position shown in the drawings.

As is known in the art, rotation of the stem 30 will move the adjusting sleeve 28 toward or away from the plug 18. This movement changes the bias applied by the spring 34 on the plug 18, thus controlling the pressure required to move the plug away from seat 16, which movement takes place when the flushometer is operated. In order to completely close the control stop, the stem 30 will De turned through the use of the screwdriver slot 38 which will move the adjusting sleeve 28 to a position in which the plug 18 cannot be moved away from the seat 16 and will be fast upon the seat. In this position the control stop is functioning as a stop and no water can pass through it.

The cap assembly which covers the access opening 20, and thereby hides the stem 30 and its screwdriver adjusting-slot 38, comprises a sleeve 40 and a cap 42. Both of these elements are preferably formed of metal, for example brass, although in some applications the sleeve maybe formed of plastic. The sleeve 40 is internally threaded, as at 44, by which the sleeve is attached onto the exterior of the bonnet 22. The sleeve has an external peripheral recess 46 which, in cooperation with a crimped flange 48 on the cap 42, holds the cap onto the sleeve, but freely rotatable relative thereto.

The cap 42, which may have the conventional hex tool flats on its exterior, as indicated at 50, or which may have a smooth exterior, has an interior chamber 52 with a recess 54 adjacent the open end of the chamber. When initially formed, the cap has a continuous unflanged exterior. The flange 48 is formed by crimping once the sleeve is positioned within the cap. There is diametral clearance between the exterior of the sleeve and the interior of the cap recess 54 whereby the cap is freely rotatable relative to the sleeve so that turning of the cap will not cause the sleeve to be threadedly removed from the bonnet.

The sleeve has diametrically positioned openings 56 which may be axially and radially aligned with similar openings 58 in the cap. Since the cap is freely rotatable relative to the sleeve, there is only one effective position in which the tool receiving openings are in alignment. When so aligned, a tool 60 in the shape of a locking pin may have its in-turned ends 62 inserted within the aligned openings 58 and 56. When the tool is so positioned, the sleeve and the cap are joined together for concurrent rotation to provide for removal of the cap assembly from the bonnet of the stop cap.

The locking pin or tool 60 has the described in-turned ends and has a coil 64 which biases the in-turned ends 62 toward each other providing a spring effect. Thus, for a maintenance person to insert the tool into the aligned openings, he must first move the in-turned ends 62 apart until they are properly positioned relative to the openings 56 and 58, at which time the bias of the coil 64 will urge the in-turned ends 62 into the aligned openings of the sleeve and the cap. When so positioned, the two elements may be turned together.

The present invention provides a vandalproof cap assembly for a control stop. The cap assembly is formed of a sleeve and a cap, with the cap being freely rotatable relative to the sleeve once the two elements are interlocked together. There are aligned tool receiving openings and a spring wire is used as the tool for concurrently turning these elements when the ends of the wire are positioned within the tool receiving openings. Without the proper tool and knowledge as to its use, the cap assembly cannot be removed.

Whereas the preferred form of the invention has been shown and described herein, it should be realized that there may be many modifications, substitutions and alterations thereto.

The embodiments of the invention in which an exclusive property or privilege is claimed are defined as follows:

1. A control stop for use in a plumbing supply line including a body, an inlet and outlet in said body, a valve seat in said body and a valve member movable toward and away from said valve seat to control flow from said inlet to said outlet, an opening in said body providing exterior access to said valve member for adjustment thereof, the improvement comprising a vandalproof cap assembly for said opening, said cap assembly including a sleeve threadedly attached to said body about said opening, and a cap mounted on said sleeve for free rotation relative thereto, said cap having an open interior and an interior annular recess adjacent one end of said cap open interior, said recess being defined by an inwardly directed flange, said sleeve having a mating exterior annular projection which fits within said recess, preventing removal of said cap from said sleeve, said sleeve and cap having tool receiving openings therein, which, when in alignment and with a tool inserted therein, will provide for concurrent movement of said sleeve and cap for removal thereof from said body opening.

2. The control stop of claim 1 characterized in that said sleeve and said cap each have a pair of diametrically positioned openings.

3. The control stop of claim 2 characterized as including a tool having a pair of inwardly directed projections which are formed and adapted to be positioned within the diametrically positioned openings of said sleeve and cap for concurrent movement thereof.

4. A vandalproof cap assembly for closing an access opening in a plumbing fitting, said cap assembly including a sleeve having an interior threaded bore formed and adapted to be threadedly attached to the plumbing fitting about the access opening thereof, and a cap attached to said sleeve and freely rotatable relative thereto, said cap having an open interior and an interior annular recess adjacent one end of said cap open interior, said recess being defined by an inwardly directed flange, said sleeve having a mating exterior annular projection which fits within said recess, preventing removal of said cap from said sleeve, said cap and sleeve each having a pair of diametrically disposed tool receiving openings, which, when in alignment, and with a tool inserted therein, will provide for concurrent rotational movement of said sleeve and cap for removal thereof from the access opening.

\* \* \* \* \*